Jan. 5, 1971 C. B. HARKER Re. 27,019

FREEZING CONDITION CONTROL

Original Filed Oct. 7, 1965

Inventor:
Charles B. Harker
By Hume, Green, Clement & Hume Attys.

United States Patent Office

Re. 27,019
Reissued Jan. 5, 1971

27,019

FREEZING CONDITION CONTROL

Charles B. Harker, Rockford, Ill., assignor, by mesne assignments, to Beatrice Foods Co., Chicago, Ill., a corporation of Delaware Original No. 3,298,190, dated Jan. 17, 1967, Ser. No. 493,670, Oct. 7, 1965, continuation of Ser. No. 669,988, Sept. 18, 1967. Application for reissue Dec. 19, 1968, Ser. No. 786,508

Int. Cl. F25c *7/12;* G01n *11/14*

U.S. Cl. 62—136 3 Claims

Matter enclosed in heavy brackets [ ] appears in the original patent but forms no part of this reissue specification; matter printed in italics indicates the additions made by reissue.

*ABSTRACT OF THE DISCLOSURE*

*An improved viscosity sensor control for a semi-frozen confection machine of the type having a cylindrical refrigerated chamber with a scraper-beater assembly. The viscosity sensor is of the drag type and is mounted radially inwardly of the scraper-beater assembly and independently thereof. Upon a predetermined rise in viscosity the viscosity sensor is arranged to secure the refrigeration for the chamber.*

*This reissue application is a continuation of co-pending reissue application, Ser. No. 669,988, filed Sept. 18, 1967.*

The present invention relates to an improvement in frozen confection machines, and more particularly to an improvement relating to the freezing condition control thereof.

It is an object of the present invention to provide a frozen confection machine having an improved control over the freezing condition of the confection therein.

It is another object of the invention to provide an ice slush or soft ice cream machine having an improved control over the consistency of the dispensed product.

It is a further object of the invention to provide means for controlling the freezing apparatus in a frozen confection machine by a direct and accurate sensing of the stiffness or viscosity of the confection being frozen.

It is a more specific object of the invention to provide a semi-frozen confection machine having an independent viscosity sensing member responsive to the viscous movement of the freezing confection thereagainst, which sensing member is connected to control the operation of the refrigeration means for the machine.

It is an additional object of the invention to accomplish the above objects by means of a simple and inexpensive yet accurate apparatus.

The invention, together with further objects and advantages thereof, will best be understood by reference to the following description taken in connection with the accompanying drawings, in which.

Figure 1:
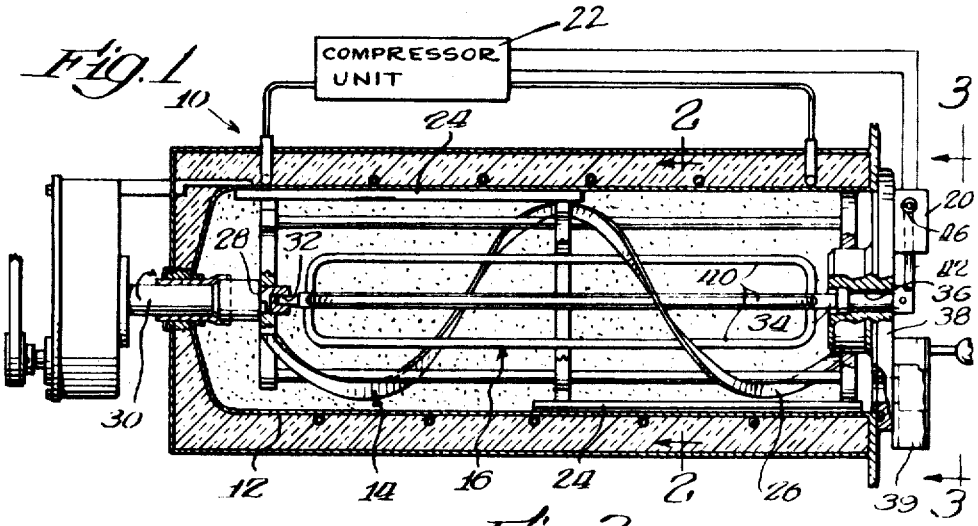
FIG. 1 is an axial cross-sectional side view of an exemplary semi-frozen confection machine in accordance with the invention.
Figure 2:
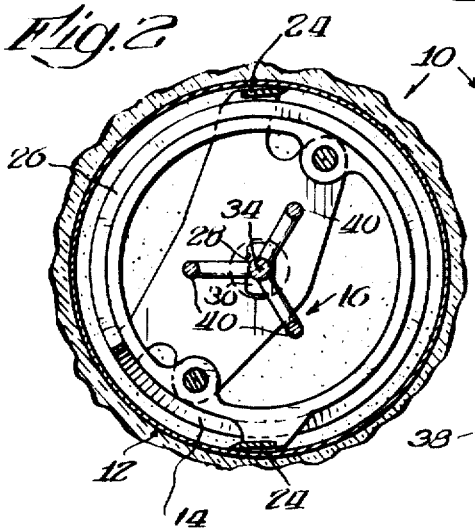
FIG. 2 is a cross-sectional view along the line 2—2 in FIG. 1.
Figure 3:
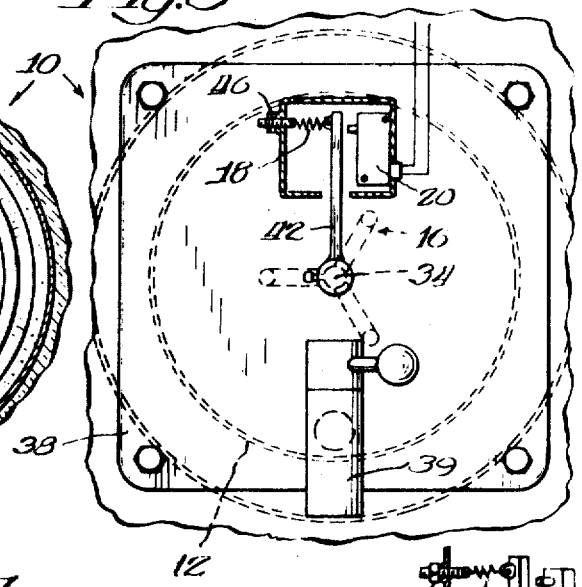
FIG. 3 is a front view of the confection machine of FIG. 1.
Figure 4:
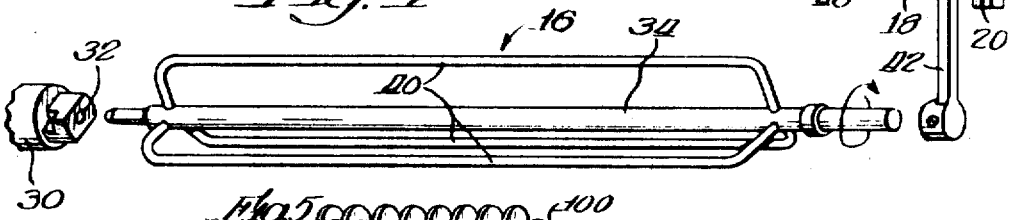
FIG. 4 is an exploded perspective view of some of the important components of the confection machine of FIG. 1.

Turning now to the drawings, there is shown in FIGS. 1–4 a semi-frozen confection machine 10 in accordance with the present invention. Basically, in the machine 10 the liquid confection is frozen in a freezing cylinder 12, where it is rotatably stirred by a constant speed beater 14. A viscosity sensing member 16 is independently rotatably mounted inside the beater 14. As the freezing confection or "slush" is rotated past the sensing member 16 the sensing member is acted upon by a torque corresponding to the viscosity or stiffness of the confection. An adjustable spring 18 is connected to resist the rotation of the sensing member 16. However, as the viscosity of the material increases the sensing member 16 has sufficient torque thereon to overcome the spring 18 and rotate sufficiently to engage a switch 20. Actuation of the switch 20 shuts off the refrigeration means cooling the freezing cylinder 12 and thereby prevents further increase in the freezing (and stiffness) of the confection. This provides a direct and accurate control over the viscosity or stiffness of the confection. Such control is quite critical since overfreezing results in an unsuitable product or inability to dispense the confection, and correspondingly underfreezing results in an overly liquid and unmerchandisable product.

The semi-frozen confection machine 10 of the invention preferably employs, where possible, conventional apparatus. Accordingly, the description herein is directed only to the specific aspects of the machine 10 relating to the present invention. The freezing cylinder 12 and [helical] rotary beater 14, for example, are preferably of a conventional construction known to the art. The cylinder [14] *12* may be conventionally cooled through a conventional electric motor driven compressor unit 22, illustrated schematically in the drawings.

The beater 14 is preferably co-axially rotatably mounted inside the freezing cylinder [14] *12*. Rotation of the beater 14 moves the scraper blades 24 over the wall of the freezing cylinder 12 and also rotates the helical beater blade 26. The rotation of the helical blade 26 provides a forward movement of the freezing confection or slush. It also, by its rotational movement through the slush, imparts a substantial rotational movement in the slush itself. Because of the substantial beating action there is additionally a substantial turbulence and mixed fluid movement in the slush, but there is a general overall rotational movement. This rotational movement is particularly pronounced in the region of the slush more closely adjacent the helical blade 26.

The end of the beater 14 opposite the discharge end of the cylinder 12 is preferably provided with a noncircular aperture 28 which fits the correspondingly noncircularly shaped end of a drive shaft 30 to allow the beater to be rotated by its driving motor. The end of the drive shaft 30 is also preferably provided with a small conical recess 32. The recess 32 provides a bearing for one end of the viscosity sensing member 16.

Considering now the preferred embodiment of the viscosity sensing member 16, it may be seen that it is an integral elongate member of metal or other suitable material. Preferably it includes an elongate cylindrical central shaft 34. One end of the shaft 34 may have a conical end bearing surface adapted to fit in the recess 32 at the end of the drive shaft 30. The other end of the central shaft 34 is adapted to extend through a closely fitted cylindrical aperture 36 in a front panel or cover 38 of the machine. The sensing member 16 may also be cantilever mounted solely from the aperture 36, eliminating the bearing support at the recess 32. The front panel 38 includes a conventional discharge or outlet valve 39. The sensing member 16 is centrally co-axially mounted through the freezing cylinder 12, extending from the front to rear thereof, and axially rotatable. Preferably the axis of rotation of the sensing member is the same as that of the beater 14.

Preferably mounted in even radial extension from the central shaft 34 of the sensing member 16 are a plurality of arms or paddles 40. They may be of any suitable number and configuration. Those illustrated herein are three in number, and are each identical small diameter cylindrical metal U-shaped rods extending substantially the full length of the sensing member. It will be noted that preferably the total cross-sectional area occupied by the arms 40 is relatively insubstantial in terms of the total cross-sectional area of the freezing cylinder. Thus the arms 40 offer a relatively insubstantial restriction to the movement of slush within the cylinder. Preferably the maximum radial extension of the arms 40 is such that the sensing member 16 may be mounted completely inside the beater 14 and not contact or interfere with the movement of the beater. However, the arms 40 are preferably located at a sufficient radial distance to approach the inside of the helical blade 26. Thereby the arms 40 are in proximity with the more rapidly rotating slush. However, it may be seen that there is no mechanical connection whatsoever between the sensing member 16 and the beater 14 or its drive system.

In addition to the function of freezing condition sensing it will also be noted that the arms 40 provide additonal stirring rods or beaters. As the freezing slush is moved passed the arms 40, which are stationary, the slush is mixed by reason of the slush passing over and around the obstacles which the arms present.

The front end of the central shaft 34 of the sensing member preferably extends through the front panel 38 at the aperture 36, and projects therefrom. This end of the central shaft 34 directly transmits the full rotation and torque of the sensing member 16 since it is an integral part thereof and the sensing member 16 is preferably mounted with low friction. In the exemplary structure disclosed herein a torque lever arm 42 is fixed at right angles to the end of the central shaft 34, so as to rotate therewith and amplify the rotational movement of the sensing member.

It is preferred that the sensing member 16 should not be allowed to actually rotate, but rather that the slight angular movement therein due to variations in the torque thereon be employed. Accordingly, an adjustable resilient counter-torque means such as an adjustable spring or weight is provided. It is provided here in the form of a spring 18 held at one end by a conventional tension adjustment 46, with the other end of the spring connected to the torque arm 42 near its outer end. Accordingly, as the central shaft 34 tends to rotate the torque arm 42, this rotation is increasingly resisted by the spring 18. Thus the torque arm 42 will rotate only until the torque on the sensing member is balanced by the spring force exerted on the torque arm 42 by the spring 18 as it is stretched outwardly. Accordingly, at a given constant torque level on the sensing member 16 an equilibrium position is established at which the sensing member is stationary.

The torque on the sensing member 16 is a function both of the slush velocity and its viscosity or stiffness. The beater 14 is preferably driven at substantially constant speed, as is conventionally practiced, and accordingly, the rotational velocity of the slush is substantially constant. Thus since the velocity is constant, any change in the torque on the sensing member is due primarily to the change in the viscosity of the slush resulting from its freezing state.

With an increase in the torque on the sensing member 16 the equilibrium position of the torque arm 42 must change. The torque arm 42 will rotate forward until the spring 18 is stretched further and a new equilibrium position of the torque arm corresponding to the increased viscosity is established. This movement of the torque arm 42 is employed to control the compressor 22 and thereby control the freezing condition in the freezing cylinder 12. Preferably this is accomplished by the switch 20, which is located adjacent the upper end of the torque arm 42. The switch 20 is positioned to be contacted and actuated by the torque arm 42 rotating into it. The torque arm 42 is restrained by the spring 18 from operating the switch 20 until the desired torque level is reached. The tension adjustment 46 may be adjusted to directly regulate the torque level at which the switch 20 operates, and thereby preselect a desired freezing condition. The switch 20 may be any suitable conventional electrical power switch, preferably an overcenter type so as to give switching stability and independence from minor pulsations in torque caused by the beater configuration.

Operation of the switch 20 cuts off power to the compressor unit 22. Thereby the freezing cylinder 12 is no longer cooled and will gradually increase in temperature sufficiently to change the freezing conditions of the slush to a more liquid or less viscous condition. In this more liquid state the torque on the viscosity sensing member 16 will be reduced. Accordingly, the spring 18 pulling back on the torque arm 42 will withdraw it from engagement with the switch 20. The switch 20 will then close, thus allowing the compressor unit 22 to restart and run until the viscosity of the slush is again raised. It will be appreciated, of course, that other switches or controls may be combined with the switch 20 to also control the compressor unit operation. Further, other torque responsive switch arrangements may be envisioned and the invention is not limited to that disclosed herein.

Figure 5:
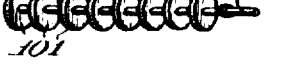
FIG. 5 shows an alternative configuration for the viscosity sensing member in the confection machine of FIG. 1.
Figure 6:
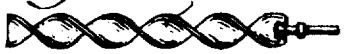
FIG. 6 shows another alternative configuration for the viscosity sensing member in the confection machine of FIG. 1.

FIGS. 5 and 6 show alternative configurations 100 and 104 respectively of the sensing member 16. The sensing member 100 and the sensing member 104 operate in the same manner as the sensing member 16 and are directly substitutable therefor. The sensing member 100 includes a spaced plurality of thick cylindrical disks 101 co-axially fixed on its central shaft. The disks 101 may be constructed from plastic or other suitable material. The sensing member 104 is preferably formed by an elongate sheet of platsic twisted into a regular helix centrally about the axis of its shaft.

The completely independent and direct viscosity measurement provided by the above-described apparatus provides a much more direct and accurate control over the freezing condition in an ice slush or ice cream machine than thermostatic switch sensing of the freezing cylinder temperature. A temperature sensing system requires supervision and readjustment during machine operation, since the critical temperature level at which the desired consistency occurs varies with the mix used and also changes with time as the mixture stands in the freezing cylinder. With the more accurate condition control provided, a higher ice level may be maintained in the freezing cylinder without danger of clogging. This enables a greater draw-off capacity since more unfrozen mix may be drawn into the cylinder before the resulting mixture in the freezing cylinder becomes too liquid. The disclosed system is also much more accurate than torque responsive switch means associated with the beater (or its motor or drive system). The beater has a high operating torque thereon due to its size, speed and the required scraping action against the cylinder wall. Thus, it is difficult to detect with accuracy with the latter means the relatively slight and critical changes in the viscosity of the slush, particularly the condition change in the dispensed central body of slush rather than that near the wall of the freezing cylinder.

In view of the foregoing description it is clear that there has been provided herein a new and improved semi-frozen confection machine having a direct, accurate and positive control over the freezing condition of the semi-frozen confection produced thereby. While the embodiment described herein is at present considered to be preferred, it will be understood that numerous variations and modifications may be made therein by those having skills in the art, and it is intended to cover in the appended claims all such variations and modifications as fall within the true spirit and scope of the invention.

What is claimed is:

[1. A semi-frozen confection machine comprising:

a freezing chamber adapted to contain and freeze liquid confection material;

refrigeration means for cooling said freezing chamber;

a rotary beater in said freezing chamber adapted to rotatably stir the confection material;

a viscosity sensing member rotatably mounted in said freezing chamber spaced inside said beater independently of said beater, said viscosity sensing member having radial extension means adapted to subject said member to torque by the rotational movement of the confection material in said freezing chamber aaginst said extension means, said viscosity sensing member having a torque transmitting shaft rotatably extending from said freezing chamber;

adjustable counter-torque means acting on said torque transmitting shaft to resist rotation of said member;

and switch means responsive to rotation of said torque transmitting shaft, said switch means controlling the operation of said refrigeration means,]

2. [The confection machine of claim 1] *A semi-frozen confection machine comprising:*

*a freezing chamber adapted to contain and freeze liquid confection material;*

*refrigeration means for cooling said freezing chamber;*

*a rotary beater in said freezing chamber adapted to rotatably stir the confection material;*

*a viscosity sensing member rotatably mounted in said freezing chamber spaced inside said beater independently of said beater;*

*said viscosity sensing member having radial extension means adapted to subject said member to torque by the rotational movement of the confection material in said freezing chamber against said extension means;*

*said viscosity sensing member having a torque transmitting shaft rotatably extending from said freezing chamber;*

*adjutable counter-torque means acting on said torque transmitting shaft to resist rotation of said member;*

*and switch means responsive to rotation of said torque transmitting shaft, said switch means controlling the operation of said refrigeration means;* wherein said radial extension means includes a plurality of spaced rods in even radial extension.

3. [The confection machine of claim 1] *A semi-frozen confection machine comprising:*

*a freezing chamber adapted to contain and freeze liquid confection material;*

*refrigeration means for cooling said freezing chamber;*

*a rotary beater in said freezing chamber adapted to rotatably stir the confection material;*

*a viscosity sensing member rotatably mounted in said freezing chamber spaced inside said beater independently of said beater;*

*said viscosity sensing member having radial extension means adapted to subject said member to torque by the rotational movement of the confection material in said freezing chamber against said extension means;*

*said viscosity sensing member having a torque transmitting shaft rotatably extending from said freezing chamber;*

*adjustable counter-torque means acting on said torque transmitting shaft to resist rotation of said member;*

*and switch means responsive to rotation of said torque transmitting shaft, said switch means controlling the operation of said refrigeration means;* wherein said radial extension means includes a plurality of spaced coaxial disk.

4. [The confection machine of claim 1] *A semi-frozen confection machine comprising:*

*a freezing chamber adapted to contain and freeze liquid confection material;*

*refrigeration means for cooling said freezing chamber;*

*a rotary beater in said freezing chamber adapted to rotatably stir the confection material;*

*a viscosity sensing member rotatably mounted in said freezing chamber spaced inside said beater independently of said beater;*

*said viscosity sensing member having radial extension means adapted to subject said member to torque by the rotational movement of the confection material in said freezing chamber against said extension means;*

*said viscosity sensing member having a torque transmitting shaft rotatably extending from said freezing chamber;*

*adjustable counter-torque means acting on said torque transmitting shaft to resist rotation of said member;*

*and switch means responsive to rotation of said torque transmitting shaft, said switch means controlling the operation of said refrigeration means;* wherein said radial extension means includes a helically twisted unitary body.

References Cited

The following references, cited by the Examiner, are of record in the patented file of this patent or the original patent.

UNITED STATES PATENTS

| | | | |
|---|---|---|---|
| 2,122,765 | 7/1938 | Weiler | 73—59 |
| 2,746,730 | 5/1956 | Swenson et al. | 62—343X |
| 2,773,507 | 12/1956 | Norris | 73—59X |
| 2,992,651 | 7/1961 | Krofta | 73—59X |
| 3,319,436 | 5/1967 | Wilch | 62—342X |
| 3,347,089 | 10/1967 | Perry | 73—59 |
| 3,108,449 | 10/1963 | Lents | 62—136X |
| 3,180,104 | 4/1965 | Goetz | 62—136 |

WILLIAM E. WAYNER, Primary Examiner

U.S. Cl. X.R.

73—59

UNITED STATES PATENT OFFICE

CERTIFICATE OF CORRECTION

Patent No. Re. 27,019 Dated January 5, 1971

Inventor(s) CHARLES B. HARKER

It is certified that error appears in the above-identified patent and that said Letters Patent are hereby corrected as shown below:

Column 4, line 41, "platsic" should read --plastic--

Column 5, line 46, "adjutable" should read --adjustable--

Column 6, line 15, "disk" should read --disks--

Signed and sealed this 11th day of May 1971.

(SEAL)
Attest:

EDWARD M.FLETCHER,JR.
Attesting Officer

WILLIAM E. SCHUYLER, JR.
Commissioner of Patents

USCOMM-DC 60376-P69
☆ U.S. GOVERNMENT PRINTING OFFICE : 1969 O—366-334